US007073979B2

(12) United States Patent
McGrew et al.

(10) Patent No.: US 7,073,979 B2
(45) Date of Patent: Jul. 11, 2006

(54) METHOD AND APPARATUS FOR PERFORMING SEWER MAINTENANCE WITH A THERMAL SENSOR

(75) Inventors: R. Michael McGrew, Fresno, CA (US); John Rinehart, Fort Lauderdale, FL (US)

(73) Assignee: Aries Industries Incorporated, Sussex, WI (US)

( * ) Notice: Subject to any disclaimer, the term of this patent is extended or adjusted under 35 U.S.C. 154(b) by 257 days.

(21) Appl. No.: 10/724,019

(22) Filed: Nov. 26, 2003

(65) Prior Publication Data
US 2005/0115338 A1  Jun. 2, 2005

(51) Int. Cl.
F16L 55/162 (2006.01)
F16L 101/18 (2006.01)

(52) U.S. Cl. .................... 405/184.2; 166/298; 73/623; 348/84; 405/184.1

(58) Field of Classification Search ............. 405/184.2, 405/184.1; 138/184.1, 97; 166/298; 73/865.8, 73/623; 348/82, 84
See application file for complete search history.

(56) References Cited

U.S. PATENT DOCUMENTS

| 2,909,975 | A | 10/1959 | Ulrich |
| 2,971,259 | A | 2/1961 | Hahnau et al. |
| 3,400,574 | A | 9/1968 | Cramer |
| 3,750,711 | A | 8/1973 | Conklin et al. |
| 3,885,091 | A | 5/1975 | Fish et al. |
| 3,958,607 | A | 5/1976 | Gray |
| 4,107,738 | A | 8/1978 | Van Norman |
| 4,197,908 | A | 4/1980 | Davis et al. |
| 4,246,604 | A | 1/1981 | Hundertmark et al. |
| 4,286,287 | A | 8/1981 | Williams |
| 4,432,931 | A | 2/1984 | Lockett |
| 4,442,891 | A | 4/1984 | Wood |
| 4,484,602 | A | 11/1984 | Guthrie |
| 4,577,388 | A | 3/1986 | Wood |
| 4,651,558 | A | 3/1987 | Martin et al. |

(Continued)

FOREIGN PATENT DOCUMENTS

DE    27 34 556    2/1979

(Continued)

OTHER PUBLICATIONS

U.S. Appl. No. 09/783,447, filed Feb. 14, 2001, Manestar.

(Continued)

Primary Examiner—Kenneth Thompson
(74) Attorney, Agent, or Firm—Michael Best & Friedrich LLP

(57) ABSTRACT

A method and apparatus for performing maintenance on sewer pipes using a thermal sensor. The method and apparatus may be applied to the reinstatement of lateral openings after a liner has been installed in a main pipe. The thermal sensor detects the location of the lateral openings by sensing the thermal conditions of the liner. The thermal condition of the portions of the liner that cover the lateral openings is different from the thermal condition of the rest of the liner. The apparatus and method is also applicable to detecting groundwater leaks in the main pipe, and is also applicable to inspecting exothermic chemical reactions in the main pipe, such as exothermic grout or epoxy used to seal the liner in the main pipe. The thermal sensor may be integrated into a camera assembly that includes a visual camera at one end and the thermal sensor at the other end. The visual camera is useful in those portions of the main pipe that are full of water.

21 Claims, 3 Drawing Sheets

U.S. PATENT DOCUMENTS

| | | |
|---|---|---|
| 4,677,472 A | 6/1987 | Wood |
| 4,701,988 A | 10/1987 | Wood |
| 4,770,105 A | 9/1988 | Takagi et al. |
| RE33,160 E | 2/1990 | Guthrie et al. |
| 4,903,129 A | 2/1990 | Bell et al. |
| 4,913,558 A * | 4/1990 | Wettervik et al. ............... 374/4 |
| 4,974,168 A | 11/1990 | Marx |
| 4,991,006 A | 2/1991 | Wood |
| 5,084,764 A | 1/1992 | Day |
| 5,105,882 A * | 4/1992 | Ralston et al. ........... 166/255.1 |
| 5,150,989 A * | 9/1992 | Long et al. ................. 405/303 |
| 5,318,395 A | 6/1994 | Driver |
| 5,374,174 A | 12/1994 | Lang, Jr. |
| 5,423,230 A | 6/1995 | Olander et al. |
| 5,457,288 A | 10/1995 | Olsson |
| 5,571,977 A | 11/1996 | Kipp |
| 5,577,864 A * | 11/1996 | Wood et al. ............. 405/184.2 |
| 5,790,185 A | 8/1998 | Auzerais et al. |
| 5,956,135 A | 9/1999 | Quesnel |
| 5,992,247 A | 11/1999 | Manestar |
| 6,020,918 A | 2/2000 | Murphy |
| 6,079,285 A | 6/2000 | Baker et al. |
| 6,295,082 B1 | 9/2001 | Dowdy et al. |

FOREIGN PATENT DOCUMENTS

| | | | |
|---|---|---|---|
| DE | 29 08 351 | | 9/1980 |
| GB | 2157796 | * | 4/1984 |
| JP | 08 220 620 | | 8/1996 |
| WO | WO 93/13352 | * | 7/1993 |
| WO | WO 94/10495 | * | 5/1994 |

OTHER PUBLICATIONS

SAT-Star Satellite Camera brochure, Wolfgang Rausch, GmbH & Co., Electronic-Maschinenbau, Weissbensberg (Lindau) Germany, published prior to Apr. 23, 1997.

LISY (Lateral Inspection SYstem) brochure, IBAK, Kiel, Germany, published prior to Apr. 23, 1997.

* cited by examiner

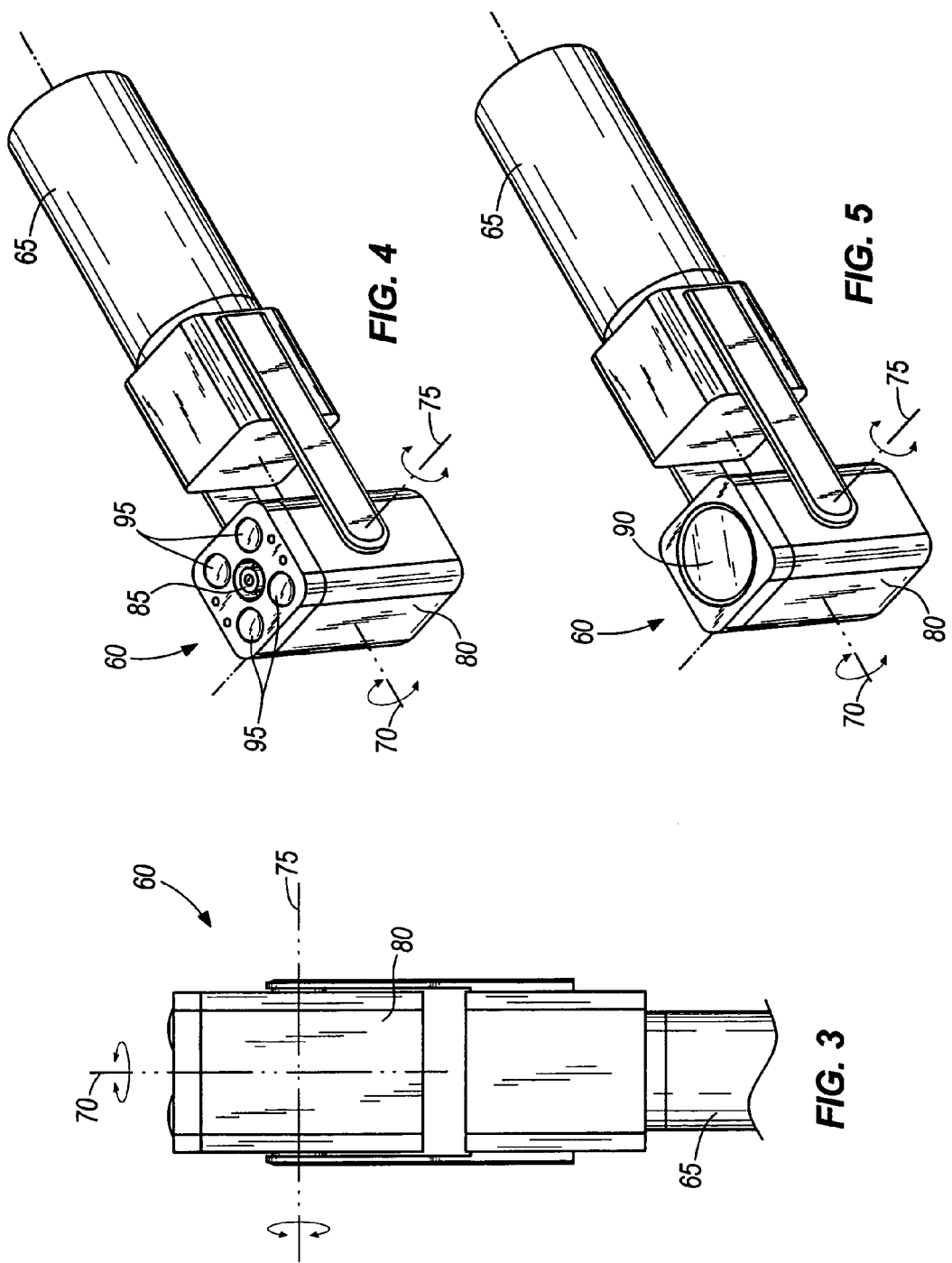

METHOD AND APPARATUS FOR PERFORMING SEWER MAINTENANCE WITH A THERMAL SENSOR

FIELD OF THE INVENTION

The invention relates to a method and apparatus for performing sewer maintenance with a thermal sensor.

BACKGROUND OF THE INVENTION

A typical sewer system includes a main pipe and a series of lateral pipes communicating between buildings and the main pipe. Main pipes require periodic inspection and maintenance as the pipe ages or is subject to external destructive forces (e.g., frost, thermal cycles, earthquakes, and the ground shifting or sinking around the pipes). One major problem that may arise from a deteriorated main pipe is the flow of groundwater into the main pipe through cracks or improperly sealed joints. If large amounts of groundwater flow into a main pipe, the sewerage authority must process the groundwater along with the sewage and waste water for which the sewer system was intended. Such unnecessary processing of groundwater can be very expensive to the sewerage authority and, ultimately, the taxpayers.

It is therefore common practice to periodically inspect main sewer pipes for cracks or flaws in the grout that seals the joints of the main pipe sections and the junctions between the main and lateral pipes. When a crack or leaking joint is discovered, the usual practice is to seal the crack or joint with grout. If the main pipe has multiple cracks and is leaking substantial amounts of groundwater, it is common to install a rigid liner to improve the containment capability of one or more sections of the main pipe.

Such liners are intended to extend the useful life of the main pipe, but the liners also cover the lateral openings during the lining process. It is necessary to cut through the liner to reestablish communication between the main and lateral pipes. If the cutting is not executed accurately, the cutting device may cut through the liner and the main pipe walls and lower the containment capability of the main pipe. If the cutting device cuts too many erroneous holes in the liner and main pipe walls, the purpose of the liner is frustrated and the main pipe may have to be dug up and replaced.

It is known to map out the positions of lateral pipe openings in the main pipe with conventional measurement techniques. After the main pipe has been mapped and lined, a robotic router or cutting device is introduced into the main pipe. The cutting device usually includes a conventional visual camera that permits an above-ground operator to see the inside of the main pipe. The operator remotely navigates the cutting device to the lateral openings by using the map that was created prior to lining the main pipe, and also using the visual camera to look for dimples in the liner that in some cases indicate the presence of a lateral opening. At each expected lateral opening location, the operator causes the cutting device to cut a hole through the liner.

The lateral openings are typically only about 3 to 4 inches in diameter. It is often very difficult in the first place to accurately map the location of lateral pipe openings in the main pipe because both the axial and radial coordinates have to be taken into account. The visual camera is sometimes helpful to confirm to the operator the location of a lateral opening due to the presence of a dimple in the liner, but it is also not uncommon for the liner to have dimples that do not correspond to lateral openings or are not centered on the lateral opening.

An operator using a conventional system is therefore often left guessing at the exact location of a lateral opening and hoping that the cutting device cuts through the liner at a location that perfectly aligns with the lateral opening. Missing the lateral opening by even a small margin can compromise the main pipe's containment capability as the cutter cuts a hole in liner and main pipe wall.

SUMMARY OF THE INVENTION

The invention provides a method and apparatus for performing maintenance on a sewer pipe. The method includes the steps of detecting with a thermal sensor variations in the thermal conditions of the sewer pipe, interpreting the variations in the thermal conditions, and performing maintenance on the sewer pipe based on the detected variations. One exemplary maintenance that may be performed with the method is the reinstatement of lateral pipe openings after the main pipe has been lined or relined. Other exemplary maintenance activities that may be performed in a main pipe with the method and apparatus include inspection of pipe liners, grout inspection, and crack detection. The thermal sensor may be, for example, a thermal imaging camera or an infrared camera or scanner.

Other features and advantages of the invention will become apparent to those skilled in the art upon review of the following detailed description, claims, and drawings.

BRIEF DESCRIPTION OF THE DRAWINGS

FIG. 3 is an enlarged view of the camera assembly of the apparatus.

FIG. 4 is a perspective view of the visual camera side of the camera assembly.

FIG. 5 is a perspective view of the infrared camera side of the camera assembly.

Figure 1:
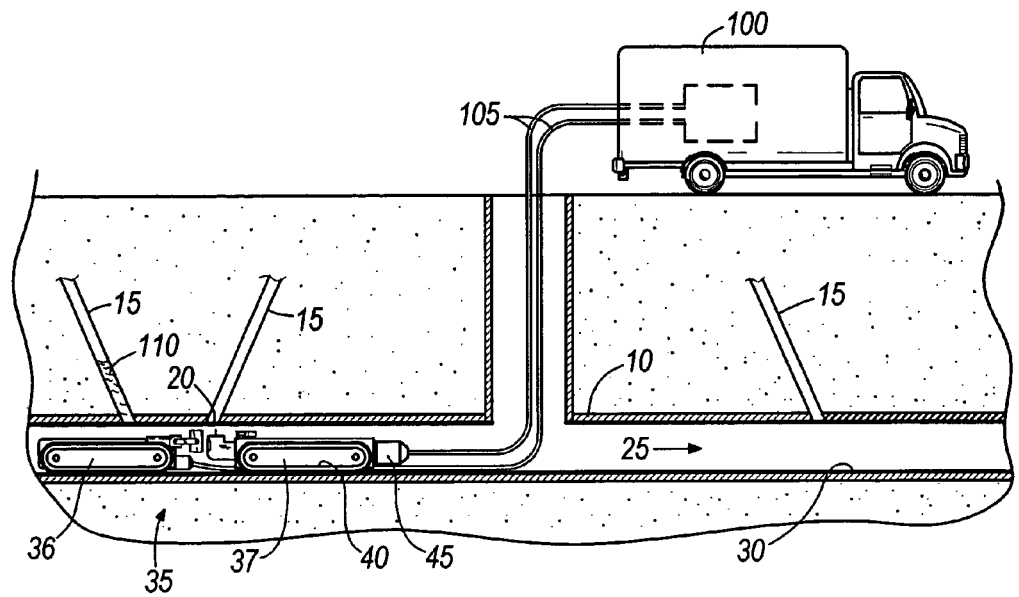
FIG. 1 is an elevation view of a sewer pipe system after a new liner has been installed and having an apparatus according to the present invention in the main pipe.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 2:
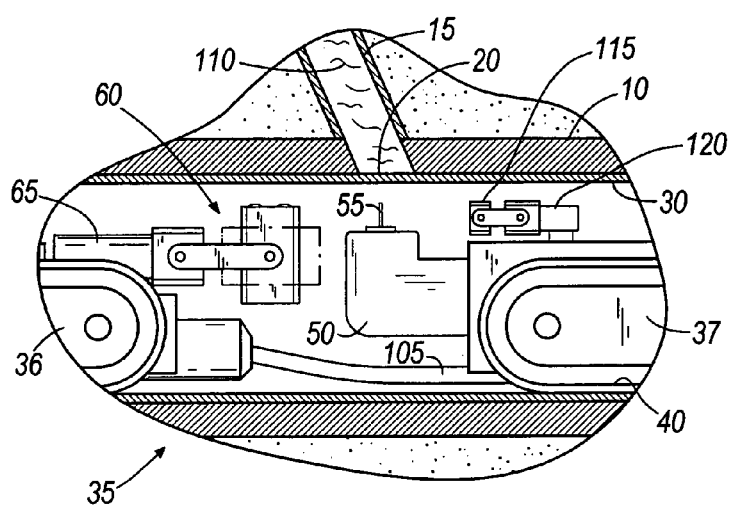
FIG. 2 is an enlarged view of the apparatus in the main pipe.

FIGS. 1 and 2 illustrate a sewer system that includes a main sewer pipe 10 and a plurality of lateral pipes 15 communicating with the main pipe 10 through lateral openings 20. The main sewer pipe 10 is preferably slightly graded such that water entering the main pipe 10 from the lateral pipes 15 flows in a downstream direction 25 in the main pipe 10. The term "upstream" as used herein, is a reference to a direction opposite the downstream direction.

In the illustrated sewer system, a liner 30 has been installed inside the main pipe 10, as is well known in the art. The liner 30 is used to seal the main pipe 10 and extend its life after some initial deterioration. One problem that arises as a result of installing the liner 30 is that the lateral openings 20 are covered by the liner 30 and have to be opened. The process of opening the lateral openings 20 by piercing the liner 30 is often referred to in the industry as "reinstatement" of the lateral openings 20. Although reinstatement is one primary application of the present invention, the invention may be used in other types of main pipe maintenance, as will be discussed below.

FIGS. 1 and 2 also illustrate an apparatus 35 for inspecting the liner 30 and reinstating the lateral openings 20. It will be appreciated that the illustrated apparatus 35 is for illustrative purposes only and is not to be regarded as limiting. The illustrated apparatus 35 includes an inspection device 36 and a separate cutting device 37, although in alternative constructions the devices 36, 37 may be incorporated into a single integrated device. Each device 36, 37 in the apparatus 35 includes a mechanism for propelling itself along the main pipe 10. The illustrated propulsion mechanism includes tracks 40, such as those disclosed in U.S. Pat. Nos. 5,992,247 and 6,505,525, the entire contents of those patents being incorporated herein by reference. The tracks 40 are driven by an on-board propulsion motor 45. Alternatively, the apparatus 35 may include another propulsion mechanism such as wheels that are driven by the on-board propulsion motor 45.

The invention does not require that the apparatus 35 be self-propelled, and the apparatus 35 may include skids or passive wheels and a rope or chain by which the apparatus 35 is pulled along the main pipe 10 by an operator above ground, such as in U.S. Pat. No. 4,197,908 for example, the entire contents of which are incorporated herein by reference. Alternatively, the inspection device 36 may be powered and drag a passive cutting device 37 behind it, or the cutting device 37 may be powered and push a passive inspection device 36 in front of it, or the cutting device 37 may be upstream of the inspection device 36 and pull or be pushed by the inspection device 36.

With particular reference to FIG. 2, the cutting device 37 has a cutting head 50 that includes a cutting element (e.g., a rotating or reciprocating bit or blade) 55 and a means for moving the cutting head 50 to engage the liner 30 with the cutting element 55. Other cutting heads than the one illustrated may also be used in the present invention, and the illustrated embodiment is not to be regarded as limiting. The cutting head 50 is used to cut through the liner 30 and reinstate the lateral opening 20 so that the main and lateral pipes 10, 15 are placed in communication with each other.

Referring now to FIGS. 3–5, the inspection device 36 has a camera assembly 60 mounted on a pan and tilt motor 65 that is well known in the art. The motor 65 permits the camera assembly 60 to pivot about a longitudinal axis 70 and also about a transverse axis 75 to give the camera assembly 60 a wide viewing range. The camera assembly 60 includes a double-ended camera body 80 that has a visual camera 85 at one end and a thermal sensor 90 at the other end. As used herein, the term "visual camera" means a camera that operates in the portion of the light spectrum that is visible to the human eye. As used herein, the term "thermal sensor" includes all of the following: (1) a thermal imaging camera that creates a visual image based on thermal gradients in the liner; (2) an infrared camera or scanner that uses an infrared beam or field to measure surface temperatures of the liner; and (3) any other device that relays information to the operator regarding thermal characteristics of the liner.

The pan and tilt motor 65 selectively rotates the body 80 to place one of the visual camera 85 and thermal sensor 90 in an active position and the other in an inactive position. In this regard, only one of the visual camera 85 and thermal sensor 90 may be active in the illustrated embodiment. It will be appreciated that the visual camera 85 and thermal sensor 90 may alternatively be provided separately and may each have a dedicated pan and tilt motor, in which case it may be possible for the camera and sensor 85, 90 to be active simultaneously.

The visual camera 85 includes a lens and lights 95 around the lens. The lights 95 assist an operator in seeing the interior of the main pipe 10. The lights 95 also produce heat which may be used to enhance the operation of the thermal sensor 90, as will be described in more detail below. The illustrated arrangement of lights 95 should not be regarded as limiting, and the lights 95 may be provided at other locations, such as on the main body of the inspection device 36 rather than on the movable camera assembly 60. The thermal sensor 90 includes a window that captures thermal signatures or temperatures from bodies in front of the sensor 90. If the thermal sensor 90 includes an infrared camera, an infrared beam is emitted from the window. The operator is positioned above ground with a base station, which may be, for example, the truck 100 illustrated in FIG. 1. The base station includes one or more monitors for viewing the images and other information transmitted by the visual camera 85 and thermal sensor 90. Cables 105 interconnect the base station to the apparatus 35 and provide all the power and video conduits necessary for operation of the apparatus 35 and the camera assembly 60. Alternatively, a single cable 105 may run from the base station to the cutting device 37, and then run from the cutting device 37 to the inspection device 36 and be useful to couple the devices 36, 37 together.

For executing a reinstatement maintenance procedure, the apparatus 35 is placed in a recently-lined main sewer pipe 10. The operator remotely controls the propulsion systems to move the apparatus 35 along the main pipe 10. The operator may use either the visual camera 85 or thermal sensor 90 while navigating along the main pipe 10. Once in the predicted vicinity of a lateral opening 20, the operator engages the thermal sensor 90 to detect thermal variations in the liner 30. The operator interprets the thermal variations to determine where the lateral openings 20 are. More specifically, the thermal signature of the liner 30 will be substantially constant for those portions of the liner 30 that are in front of the pipe walls and surrounded by earth. The thermal signature of the liner 30 in front of a lateral opening 20 will typically be different (e.g., usually cooler) than the rest of the liner 30. The operator positions the inspection device 36 so that both the lateral opening 20 and the cutting head 50 are within the field of view of the visual camera 85 or thermal sensor 90, and then cuts through the liner 30 with the cutting element 55 to reinstate the lateral opening 20 and reestablish communication between the main and lateral pipes 10, 15.

The thermal variations may be enhanced by filling the lateral pipe 15 with water (as at 110 in FIGS. 1 and 2) such that the liner 30 holds the water in the lateral pipe 15. The thermal variations are especially enhanced if the water is relatively cool. The lateral pipe 15 may be filled with water by flushing a toilet or running a faucet, for example, after the main pipe 10 has been lined 30. The thermal sensor 90 will more easily identify the location of the lateral opening 20 if the portion of the liner 30 in front of the lateral opening 20 is cooled by the water.

When using a thermal imaging camera, for example, the portion of the liner 30 covering a lateral opening 20 appears as a cool spot (often colorized for visibility or a bright spot on a black and white thermal imaging camera). The thermal imaging camera will also typically permit the operator to see the cutting head 50 and cutting element 55, and the operator can therefore guide the cutting element 55 precisely to the cool spot while monitoring the movement of the cutting head 50 through the thermal imaging camera.

Figure 6:
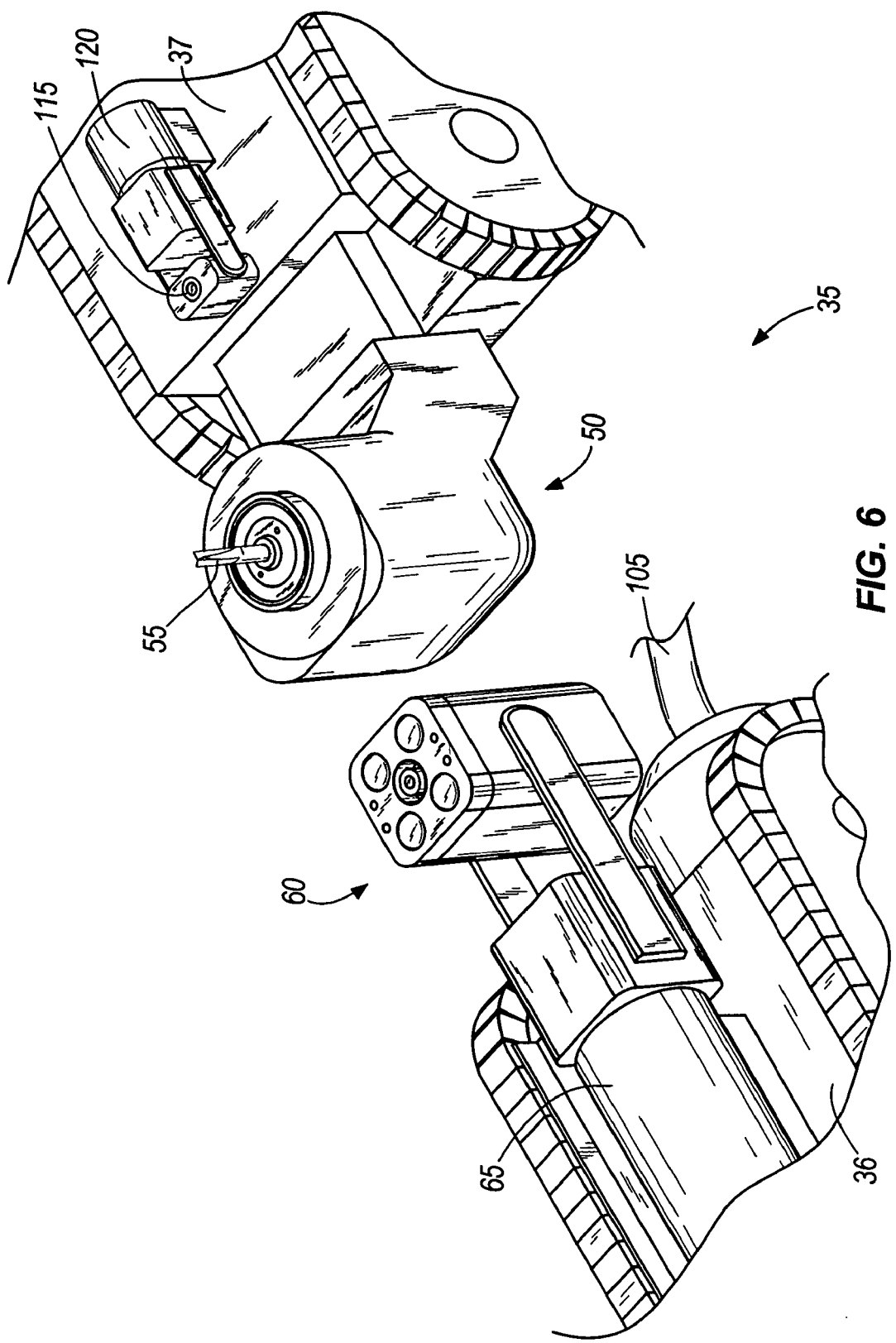
FIG. 6 is a perspective view of a portion of the apparatus.

When the operator is unable to see the cutting head 50 through the use of the thermal sensor 90 (e.g., when some types of infrared cameras or other non-imaging sensors are used), the operator will need a means for marking 115 (FIGS. 2 and 6) the cool spots on the liner 30 so the operator can guide the cutting device 50 to the lateral openings 20 with the visual camera 85. For that purpose a laser pointer, a light, or other indicator may be employed to mark the location of the lateral opening 20. The marker 115 may for example, be mounted on its own pan and tilt motor 120 and may be operated independently of the camera assembly pan and tilt motor 65. The marker 115 is illustrated as being mounted on the cutting device 37, but may alternatively be mounted on the inspection device 36. The marker 115 may have both thermal and visual characteristics such that the operator can confirm with the thermal sensor 90 (e.g., by detecting a change in temperature at the desired spot) that the marker 115 is pointed at the lateral opening 20, and then switch to the visual camera 85 and still see the location marked by the marker 115. Alternatively, the marker 115 may be capable of leaving a mark in the liner that can be seen by the visual camera 85. For example, the marker may employ a focused light (e.g., a laser or the like) that will leave a burn mark on the liner.

As mentioned above, the lights 95 around the visual camera 85 generate heat. The operator may use the lights 95 to heat a localized portion of the liner 30 where a lateral opening 20 is expected to be, and then switch to the thermal sensor 90. Those portions of the liner 30 that are over the lateral openings 20 will typically cool faster than those portions of the liner 30 that are against the pipe walls and surrounded by earth, and the thermal sensor 90 will identify the more rapidly cooling portion of the liner 30. This effect can be enhanced by filling the lateral pipe 15 with cool water as discussed above.

As the cutting element 55 pierces the liner 30, the water in the lateral pipe 15 will rush down into the main pipe 10. The rapid influx of cool water into the main pipe 10 may create a substantially homogenous temperature condition or "thermal wash-out" across the pipe 10. Without thermal variations in the main pipe 10 the thermal sensor 90 may be virtually useless in navigating and operating in the main pipe 10. The operator may therefore wish to switch to the visual camera 85 while further trimming the lateral opening 20 and moving the apparatus 35 to a point sufficiently upstream of the newly-reinstated lateral opening 20 such that the apparatus 35 is not surrounded with water. The operator may then switch to the thermal sensor 90 to reinstate the next lateral opening 20, and continue reinstating lateral openings 20 in an upstream progression so that the apparatus 35 is not surrounded by water while attempting to locate and reinstate lateral openings 20 with the thermal sensor 90.

The invention has main pipe maintenance applications other than assisting in the reinstatement of lateral openings. For example, the apparatus 35 is useful for inspecting whether a liner 30 has been installed properly. Many liners 30 are installed by applying a source of heat (e.g., steam) to the liner 30 and then letting the liner 30 cure in place. The apparatus 35 may be inserted into the main pipe 10 soon after the liner 30 has been heated, and used to inspect the temperature of the liner 30. In this way, the apparatus 35 may be used to detect any cool spots in the liner 30 that were not heated properly and that will therefore not properly cure. If put into the main pipe 10 very quickly after heating the liner 30, the apparatus can also detect whether the liner 30 reached at least the minimum temperature required to begin the curing process.

As mentioned above, groundwater seepage can be a major problem in a sewer system. Because groundwater is typically much cooler than the sewage in the main pipe 10, the apparatus 35 may be used to detect the presence and source of groundwater in the main pipe 10. Once detected, the appropriate equipment may be brought in to seal off the main pipe 10 (e.g., with a liner or with grout or another sealant) to stop the groundwater seepage. The camera assembly 60 may be integrated in such repair equipment so that the pipe defects can be repaired immediately upon detection.

Also with respect to groundwater seepage, the apparatus 35 may be used to detect pockets of groundwater building up between the liner 30 and the main pipe walls. This can occur when a liner 30 is not properly installed or for some reason is not adhered to the main pipe walls. The resulting pockets in the liner 30 can fill with groundwater. Such pockets would be virtually undetectable with a visual camera, but would appear as bright spots on a thermal imaging camera display or as a cool spot on a non-imaging thermal sensor such as an infrared camera.

The apparatus 35 may also be used to inspect any exothermic materials used in the main pipe 10. For example, where an epoxy grout or liner material is used to seal a crack or joint, the epoxy material will create heat during curing due to an exothermic chemical reaction. The apparatus 35 may be used to view the presence and consistency of the grout or liner material by monitoring the material's thermal signature. The apparatus 35 could also be used to monitor endothermic reactions by monitoring the rate at which temperature decreases.

The invention claimed is:

1. A method of performing maintenance on a sewer system that includes a main pipe and a plurality of lateral pipes communicating with the main pipe through lateral openings in the main pipe, the method comprising:
    covering the walls of the main pipe with a liner that cuts off communication between the main and lateral pipes by covering the lateral openings;
    detecting with a thermal sensor variations in the thermal conditions of the liner;
    interpreting the variations in the thermal conditions to identify the portions of the liner that cover lateral openings; and
    cutting through the portions of the liner that cover lateral openings to establish communication between the main and lateral pipes;
    wherein the main pipe includes an upstream end and a downstream end that is lower than the upstream end, such that water flowing out of the lateral pipes into the main pipe flows toward the downstream end of the main pipe; and wherein the cutting step includes establishing communication between the main and lateral pipes in an upstream progression.

2. The method of claim 1, wherein the thermal sensor includes a thermal imaging camera and a screen displaying images from the thermal imaging camera; and wherein the detecting step includes using the thermal imaging camera and screen to view the thermal conditions of the liner.

3. The method of claim 2, wherein the cutting step includes viewing a cutting device through the thermal imaging camera and screen and using the images displayed on the screen to guide the cutting device to the portions of the liner covering lateral openings.

4. The method of claim 1, wherein the thermal sensor includes an infrared camera capable of detecting the temperature of a surface; and wherein the detecting step includes scanning the liner with the infrared camera to detect the thermal condition of the liner.

5. The method of claim 4, further comprising marking the location of a lateral opening that has been detected with the infrared camera; confirming with the infrared camera that the mark is appropriately positioned; and viewing the mark with a visual camera; wherein the cutting step includes using the visual camera to guide a cutting device to the marked portion of the liner and using the cutting device to cut the liner at the mark to open the lateral opening.

6. A method of performing maintenance on a sewer system that includes a main pipe and a plurality of lateral pipes communicating with the main pipe through lateral openings in the main pipe, the method comprising:
    covering the walls of the main pipe with a liner that cuts off communication between the main and lateral pipes by covering the lateral openings;
    detecting with a thermal sensor variations in the thermal conditions of the liner;
    interpreting the variations in the thermal conditions to identify the portions of the liner that cover lateral openings;
    cutting through the portions of the liner that cover lateral openings to establish communication between the main and lateral pipes; and
    prior to the detecting and interpreting steps, introducing water into the lateral pipes and retaining the water in the lateral pipes with the portions of the liner that cover the lateral openings.

7. The method of claim 1, further comprising the step of applying localized heat to the liner in an approximate position of a lateral opening prior to the detecting step.

8. The method of claim 7, further comprising the steps of, prior to the detecting and interpreting steps, introducing water into the lateral pipes and retaining the water in the lateral pipes with the portions of the liner that cover the lateral openings; wherein the detecting step includes monitoring the rate at which the applied localized heat dissipates from the liner; and wherein the interpreting step includes identifying as covering a lateral opening those areas of the liner that dissipate heat relatively quickly due to the water behind the liner.

9. The method of claim 7, wherein the applying localized heat step includes directing a source of light and heat toward the approximate position of a lateral opening.

10. The method of claim 1, wherein the cutting step includes using a cutting device to cut through the liner; and wherein the step of establishing communication between the main and lateral pipes in an upstream progression includes:
    cutting the liner with the cutting device to open the lateral opening for a first lateral pipe to permit water to flow from the first lateral pipe into the main pipe;
    using a visual camera to navigate the cutting device in the main pipe upstream of the water flowing out of the first lateral opening;
    using the thermal sensor to execute the detecting and interpreting steps to identify a second lateral opening that is upstream of the first lateral opening; and
    cutting the liner with the cutting device to open the second lateral opening.

11. A method of performing maintenance on a sewer pipe, the method comprising the steps of:
    detecting with a thermal sensor variations in the thermal conditions of the sewer pipe;
    interpreting the variations in the thermal conditions to determine where maintenance is needed;
    performing maintenance on the sewer pipe as determined in the interpreting step; and
    installing a liner in the sewer pipe, the liner having an exothermic adhesive;
    wherein the detecting step includes using the thermal sensor to identify the heat generated by the exothermic reaction;
    wherein the interpreting step includes using the detected temperature information to determine whether the liner was properly installed in the sewer pipe; and
    wherein the performing maintenance step includes repairing the liner if it is determined that the liner was improperly installed.

12. The method of claim 11, wherein the sewer pipe includes a main pipe and a plurality of lateral pipes communicating with the main pipe through lateral openings in the main pipe, wherein the walls of the main pipe are covered with a liner that cuts off communication between the main and lateral pipes by covering the lateral openings;
    wherein the detecting step includes detecting with the thermal sensor variations in the thermal conditions of the liner;
    wherein the interpreting step includes interpreting the variations in the thermal conditions to identify the portions of the liner that cover lateral openings; and
    wherein the performing maintenance step includes cutting through the portions of the liner that cover lateral openings to establish communication between the main and lateral pipes.

13. A method of performing maintenance on a sewer pipe, the method comprising the steps of:
    detecting with a thermal sensor variations in the thermal conditions of the sewer pipe;
    interpreting the variations in the thermal conditions to determine where maintenance is needed;
    performing maintenance on the sewer pipe as determined in the interpreting step; and
    installing a liner in the sewer pipe and applying heat to the liner such that the liner cures in place within the sewer pipe;
    wherein the detecting step includes detecting with the thermal sensor variations in the temperature of the liner prior to the liner substantially curing;
    wherein the interpreting step includes using the detected temperature information to determine whether the liner was properly heated prior to curing; and
    wherein the performing maintenance step includes applying more heat to the liner if it is determined that portions of the liner were not properly heated.

14. The method of claim 11, wherein the sewer pipe includes grout having an exothermic reaction;
    wherein the detecting step includes using the thermal sensor to identify the location and condition of the grout based on the heat generated by the exothermic reaction;
    wherein the interpreting step includes determining whether the grout was properly applied; and wherein the performing maintenance step includes repairing the grout if it is determined that the grout was improperly applied.

15. The method of claim 11, wherein the detecting step includes detecting relatively cool portions of the pipe; wherein the interpreting step includes determining whether the relatively cool portions of the pipe are the source of groundwater leaks; and wherein the performing maintenance step includes patching any cracks in the sewer pipe at the source of the groundwater leaks.

16. An apparatus for performing maintenance on a sewer pipe, the apparatus comprising:
a thermal sensor;
means for moving the apparatus within the sewer pipe;
means for performing maintenance on the sewer pipe;
wherein the thermal sensor includes an infrared camera capable of detecting the temperature of a surface;
wherein the sewer pipe includes at least one lateral pipe opening that is covered by a liner, wherein the infrared camera is capable of detecting the location of the covered lateral opening, wherein the means for performing maintenance includes a cutting device for cutting through the liner, the apparatus further comprising:
a visual camera; and
means for marking the location of the lateral opening such that the marked location is detectable by both the infrared camera and the visual camera;
wherein the infrared camera is operable to detect the section of liner that covers a lateral opening based on the temperature of the liner; and
wherein the visual camera is capable of monitoring the cutting device to accurately position the cutting device to cut through the portion of the liner covering the lateral opening.

17. The apparatus of claim 16, wherein the visual camera and thermal sensor are contained within a single body having opposite ends, the visual camera being at one end of the body and the thermal sensor being at the opposite end of the body such that the visual camera and thermal sensor face away from each other.

18. The apparatus of claim 17, further comprising a pan and tilt motor supporting the body and capable of rotating the body to move one of the visual camera and thermal sensor into an active position for use by an operator and to move the other of the visual camera and thermal sensor into an inactive position.

19. The apparatus of claim 16, wherein the thermal sensor includes a thermal imaging camera capable of creating a visual display of the thermal condition of a surface.

20. The apparatus of claim 16, wherein the means for moving includes a propulsion motor mounted on the apparatus and a track drive system driven by the propulsion motor.

21. The apparatus of claim 16, further comprising a pan and tilt motor for adjusting the orientation of the thermal sensor.

* * * * *